(12) United States Patent
Stutts

(10) Patent No.: US 7,731,217 B2
(45) Date of Patent: Jun. 8, 2010

(54) SELF ALIGNING TRAILER HITCH

(76) Inventor: Abe Stutts, 22509 Chard Ave., Gerber, CA (US) 96035

( * ) Notice: Subject to any disclaimer, the term of this patent is extended or adjusted under 35 U.S.C. 154(b) by 358 days.

(21) Appl. No.: 11/731,315

(22) Filed: Mar. 30, 2007

(65) Prior Publication Data
US 2008/0238035 A1 Oct. 2, 2008

(51) Int. Cl.
B60D 1/14 (2006.01)
(52) U.S. Cl. ..................................... 280/477
(58) Field of Classification Search ................. 280/477
See application file for complete search history.

(56) References Cited

U.S. PATENT DOCUMENTS 4,042,254 A * 8/1977 Allen ....................... 280/479.3
4,178,011 A * 12/1979 Kirsch ......................... 280/477
4,421,340 A * 12/1983 Kramer et al. ............ 280/479.1
4,666,177 A * 5/1987 Vinchattle .................... 280/477
4,811,965 A * 3/1989 Eubanks .................. 280/455.1
4,844,497 A * 7/1989 Allen .......................... 280/477

* cited by examiner

Primary Examiner—Kevin Hurley
(74) Attorney, Agent, or Firm—William S. Bernheim

(57) ABSTRACT

A device for bringing the separated truck and trailer borne elements of a goose neck hitch arrangement fully into position for completing the mating of the two elements without requiring the vehicle operator to leave the vehicle; and then for completing the mating of the elements and locking the hitch into place with the vehicle.

An open bottomed receiver well is located in the tow vehicle bed. The trailer borne hitch section that drops into the receiver well comprises a funnel shaped member having a rod shaped probe as its lower end. The rod shaped probe, dependent from the goose neck trailer tongue is used to visually align the hitch over the receiver well as the truck is backed beneath it. The driver then exits and the probe serves to guide the hitch into the receiver well as the trailer tongue is lowered toward the truck bed following which a pair of lock pins are used to complete the hitching.

2 Claims, 6 Drawing Sheets

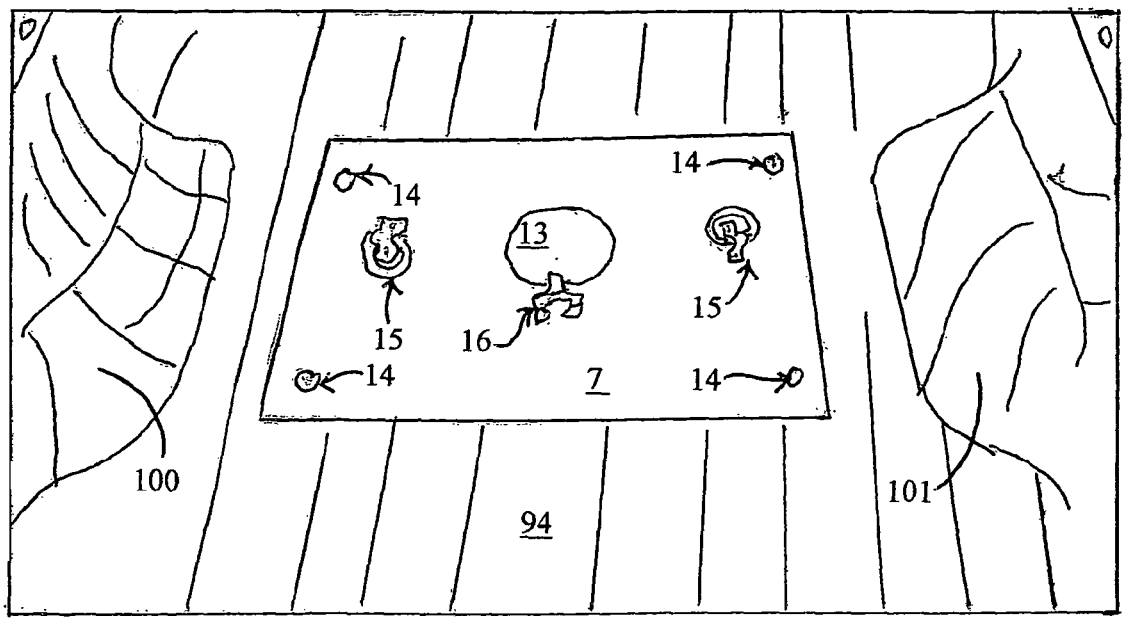
FIG. 3a
FIG. 3b
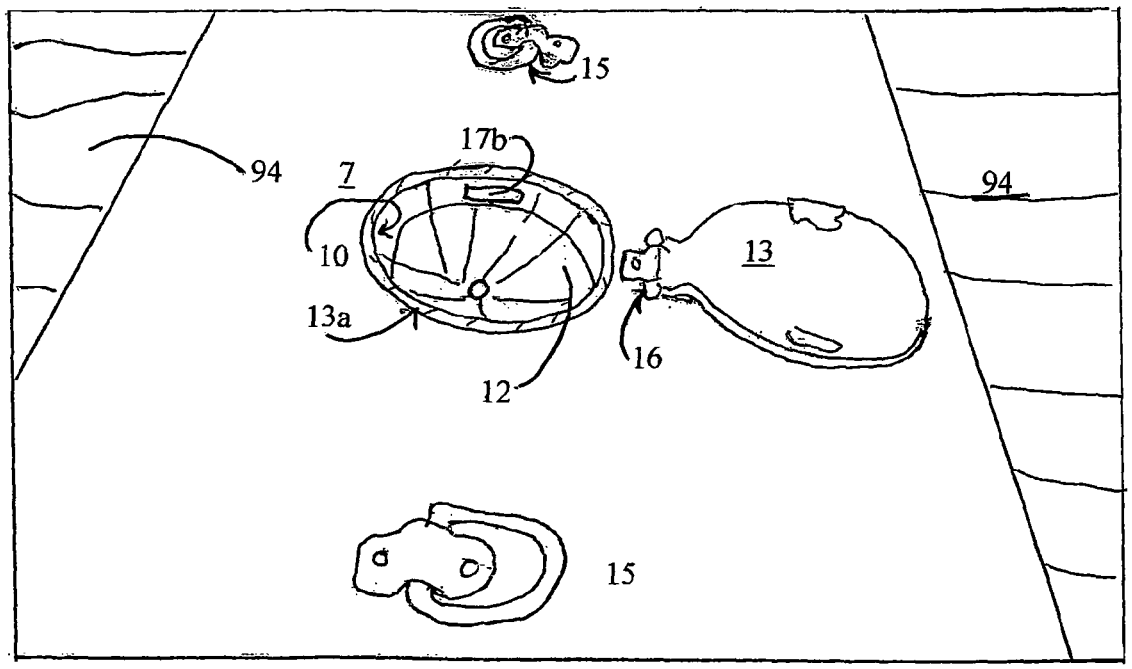

SELF ALIGNING TRAILER HITCH

BACKGROUND OF THE INVENTION

1. Field of Invention

The present invention relates generally to vehicles and trailers and more specifically it relates to a vehicle alignment system for properly aligning a tow vehicle to a trailer that is equipped with a "goose-neck" tongue assembly without requiring the vehicle operator to leave the vehicle until s/he exits the cab in order to mechanically lock the connection between the tow vehicle's and the trailer's hitch component sections.

2. Description of the Relevant Prior Art

There are two generally used basic types of tow-vehicle to trailer attachment units. The oldest and most commonly seen is the conventional form seen with boat trailers, and other such light duty trailers where the hitch assembly unit is located at the rear of the tow vehicle. In this arrangement, the trailer tongue ends in a downward facing socket that mates with an upward facing ball that is affixed to the tow vehicle rear bumper or to the frame immediately beneath same.

More recently, a so called "goose neck" tongue assembly was developed, and in this type of assemblage the connection between the tow vehicle and the trailer is made within the confines of the tow vehicle's bed. The main advantage of using goose-neck tongue arrangements is that they allow trucks to more readily pull heavier loads than could be towed with a rear mount ball and socket arrangement. The hitch assembly used in such arrangements is usually of the "fifth wheel" type that is commonly used for towing recreational vehicles, livestock trailers and other such large trailers, although, a ball and socket attachment can also be used.

The fifth wheel attachment system comprises a metal pin, the "kingpin", that projects downward from the tongue of the trailer and which becomes affixed within a set of metal plates that are attached atop the bed of the tow vehicle Regardless of the type of hitch being used, the trailer and the towing vehicle must be aligned in three dimensions in order to affect coupling between them. That is, the vehicle's and the trailer's hitch elements must be carefully aligned in a vertical, lateral, and longitudinal direction before the hitch elements can actually be engaged and locked into position. In general, the closer the tow vehicle is brought to the trailer, the less visible one or both or the mating sections become to the driver of the tow vehicle and anyone who has attempted to connect a trailer to a tow vehicle has dealt with the problem of how difficult it can be to properly align the attachment mechanism of the vehicle with that of the trailer.

Two basic solutions to this problem have been developed, the driver can enlist the help of a second person who stands alongside the vehicle and guides the driver into the proper position, or, the driver can use a guidance device that s/he can use to judge the respective positions between the trailer and tow vehicle attachment members.

The obvious disadvantages to these two solutions is that another person is not always available to act as a guide; and, using a guidance device requires that the driver dismount from the tow vehicle to attach or engage the guidance device, then return into the vehicle to do the alignment step, after which s/he can get out and must remove and store the guidance mechanism before mating the hitch elements.

In the hands of an unskilled driver, the alignment operation involves much trial and error and can be very frustrating and time consuming, and even highly skilled drivers find that several attempts are commonly needed to get into the exact position necessary for connection.

Trailer hitch guides employ a wide variety of aids designed to allow the driver to align the two mating sections with fewer trial and error maneuvers. Unfortunately, these guides are commonly complex, difficult to install, or awkward to adjust, maintain, and use. Also, the guides may not transfer easily from one vehicle-trailer pair to another, and they also present the problem of storing them when they are not in use.

SUMMARY OF THE INVENTION

Examples of patented devices which are designed to provide guidance while approximating a tow vehicle and a trailer include: U.S. Pat. No. 5,558,352 to Mills; U.S. Pat. No. 5,269,554 to Law et al.; U.S. Pat. No. 4,723,788 to Suter; U.S. Pat. No. 4,666,176 to Sand; U.S. Pat. No. 4,012,056 to Christensen; U.S. Pat. No. 3,015,162 to Bohnet; U.S. Pat. No. 5,596,944 to Massie; U.S. Pat. No. 6,042,136 to Heinecke; U.S. Pat. No. 6,273,448 to Cross; and U.S. Pat. No. 6,209,902 to Potts.

Aside from any other deficiencies, the most significant shortcoming of all these and similar patents is that they all require that the operator of the tow vehicle must leave the vehicle to set up the guidance apparatus, and then get back into the vehicle before bringing the hitch elements into the proper spatial relationship for connecting the two units.

Given all the patents that have already been issued with the intent of providing a more reliable guidance system and especially one that neither requires the assistance of a second person nor requires that the operator of the tow vehicle exits the vehicle prior to actually locking the connection between the sections of the hitch unit; it seems that it would be desirable to provide a hitch that actually allows the operator to align the two hitch section without leaving the tow vehicle until the moment the two hitch components are ready to be locked in place.

Schneckloth (U.S. Pat. No. 4,183,548) presents a patent that " . . . pertains to hitches of the type suitable for connecting goose-neck arms to the beds of pickup trucks and particularly to hitches that have means for guiding the connectors of the hitches together . . . ". According to paragraph 6 of the patent's section on the description of the preferred embodiments, it is necessary that " . . . the fifth-wheel assembly 13 at the end of the arm of the vehicle that is to be towed is over the central rear portion of the base 21". As described, his invention provides no automatic means of achieving this end, thus requiring that either a 2nd person be available to provide guidance, or that a guiding flag arrangement be attached in order to allow the driver to guide the hitch arrangement into this position.

Another drawback is that in order for the self-guidance device to drive the trailer's component into the final position in the bed mounted portion of the hitch, the following must be done: "The front end of the vehicle to be towed is then lowered so that the lower surface of the lower disk 18 of the fifth-wheel assembly 13 rests on the base 21"; it should be noted that as it is described in the patent text, this requires that a second person be available, or, that the driver must dismount, lower the gooseneck arrangement down to the plate on the bed of the tow vehicle, then re-enter the vehicle's cab and back up until the trailer is felt to drop into position, only then can s/he exit the cab for the final hookup/stabilization of the connection. Although Schneckloth's design has the desirable feature of allowing that either a ball-and-socket assembly or a king-pin arrangement trailer can be accommodated, it has a drawback in that it requires the expense and inconvenience of the owner having a series of discs that can be interchanged in order to accommodate the differing couplers found on the different trailers. These disk sets are large and cumbersome and are not easily removed or exchanged.

STATEMENT OF THE OBJECTIVES OF THE INVENTION

Accordingly, it is an object of this invention is to provide an apparatus for use in the process of aligning a tow vehicle and a trailer that has the advantage of allowing the alignment to be made without the driver needing to exit the vehicle until after the separate elements of the hitch are actually positioned for final engagement one within the other and the hitch assembly is ready to be locked into place.

Another object of this invention is to provide an alignment system that provides a mechanism and process that physically carries the two hitch elements into a travel-ready position and only requires final locking of the elements into place.

A further object is provide an assembly that allows the above mentioned advantages while also affording the flexibility of easily accommodating trailers that are equipped with either ball-and-socket or king-pin attachment apparatuses.

It is another object of this invention that it allows simple coverage of the truck-bed attachment unit so that the tow vehicle can be used for purposes other than trailer towing without having to unbolt and remove an above-bed semi-truck-plate such as is common in the prior art.

It is a further object of the present invention to provide a new and improved trailer hitch guide system which is of a durable and reliable construction, and which may be easily and efficiently manufactured and marketed.

It is another object of this invention that it allows of attachment uses other than trailer to truck, including but not being limited to attachment of superstructures for internal truck-bed assemblies such as those used to carry panes of glass, bicycles and such, in a secure, upright position within the truck bed.

BRIEF DESCRIPTION OF THE DRAWINGS

FIG. 3a. Presents a perspective view of the Base Plate of the Truck Bed Receiver Unit, looking from the back of the truck bed forward, and showing the hinged Truck Receiver Cover in a closed position.

FIG. 3b. Presents a perspective view from the side of the pick-up bed showing the hinged Truck Receiver Cover in an opened position, ready to receive the Truck Hitch Assembly as the latter is seen in FIG. 1a.

DETAILED DESCRIPTION OF A PREFERRED EMBODIMENT

Figure 1A:
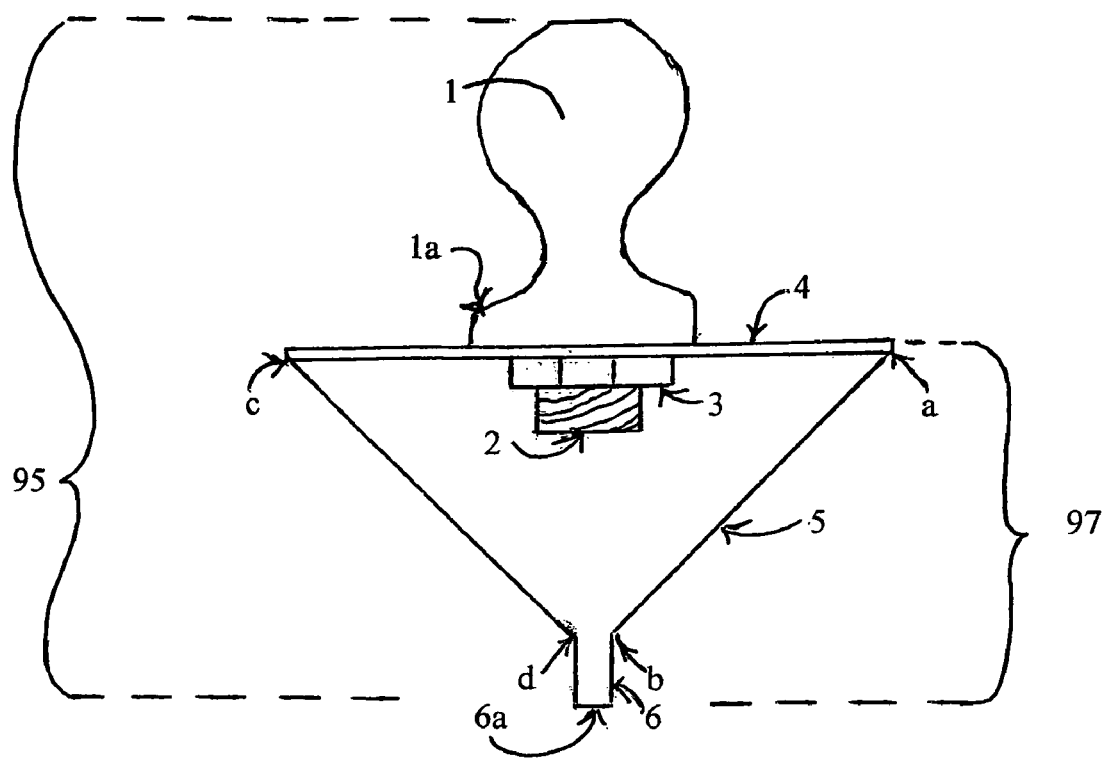
FIG. 1a. Presents a side view of a centrally located vertical cross section of a completed Truck-Hitch Assembly.
Figure 5A:
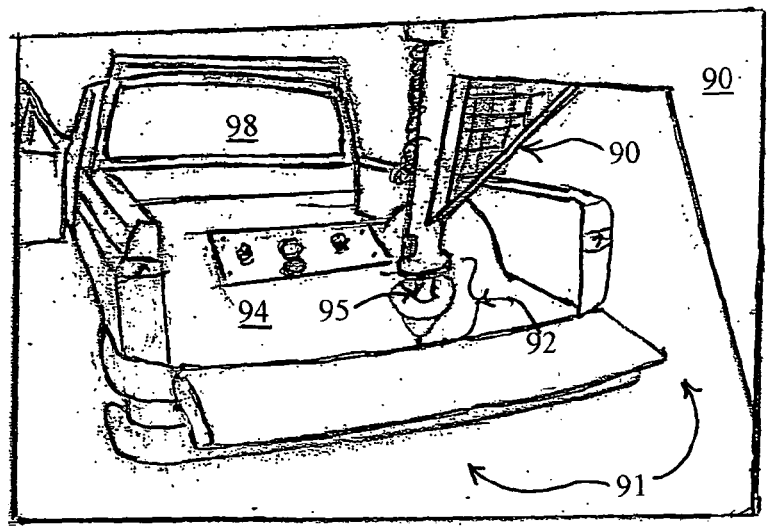
FIG. 5a,b,c,d: Present 4 sketches that viewed from top to bottom serially show the progression of the truck hitch and truck receivers from widely separated to their complete union in place in the truck bed.
Figure 5B:
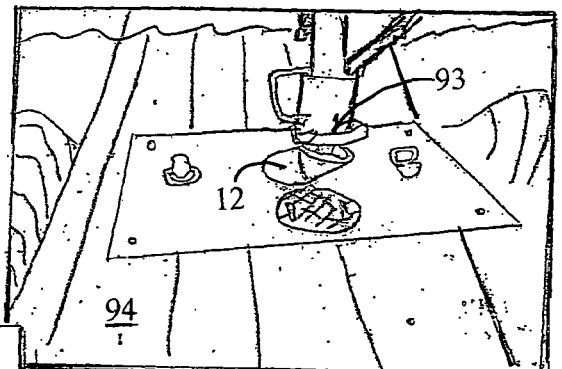

In one embodiment, the invention, a hitch assembly 92 FIG. 5a, is used for connecting a trailer borne portion of a trailer hitch socket connector section 93 FIG. 5a of a gooseneck trailer tongue 90 FIG. 5a to a truck or another such tow vehicle 91 FIG. 5a using a ball and socket connection 1,1a FIG. 1a plus 93 FIG. 5b.

With this invention, said socket connector 93 of the trailer gooseneck tongue 90 requires no modification, all improvements involving modification of either a hitch ball 1,1a,2,3 FIG. 1a portion of a ball and socket trailer hitch and a modification of a bed 94 FIG. 5a of the tow vehicle itself.

In the prior art, a ball portion 1,1a FIG. 1 and said socket connection portion 93 FIG. 5b of the ball and socket hitch are separated when the tow vehicle and the trailer are disengaged, the hitch ball 1,1a FIG. 1 going with the truck and the socket being permanently affixed to the trailer (Not shown in its entirety).

In the current invention, even when the trailer is disconnected from the tow vehicle, the hitch ball 1,1a FIG. 1a portion of the hitch is left anchored in a removable attachment within the trailer tongue socket connector section 93 FIG. 5b of the trailer's goose neck tongue 90 FIG. 5a.

Figure 1B:
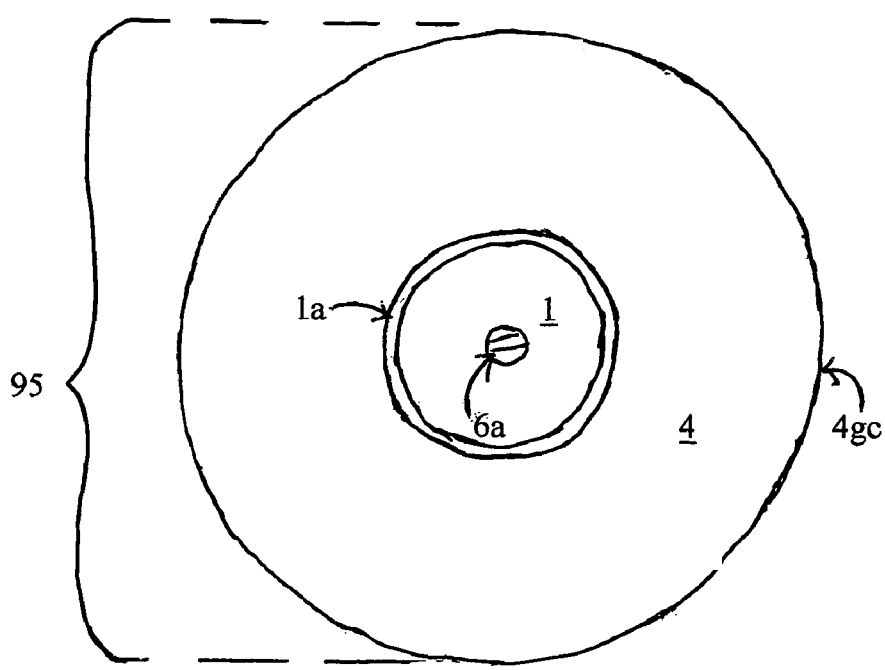
FIG. 1b. Presents a top view looking down upon a completed Truck-Hitch Assembly.
Figure 2:
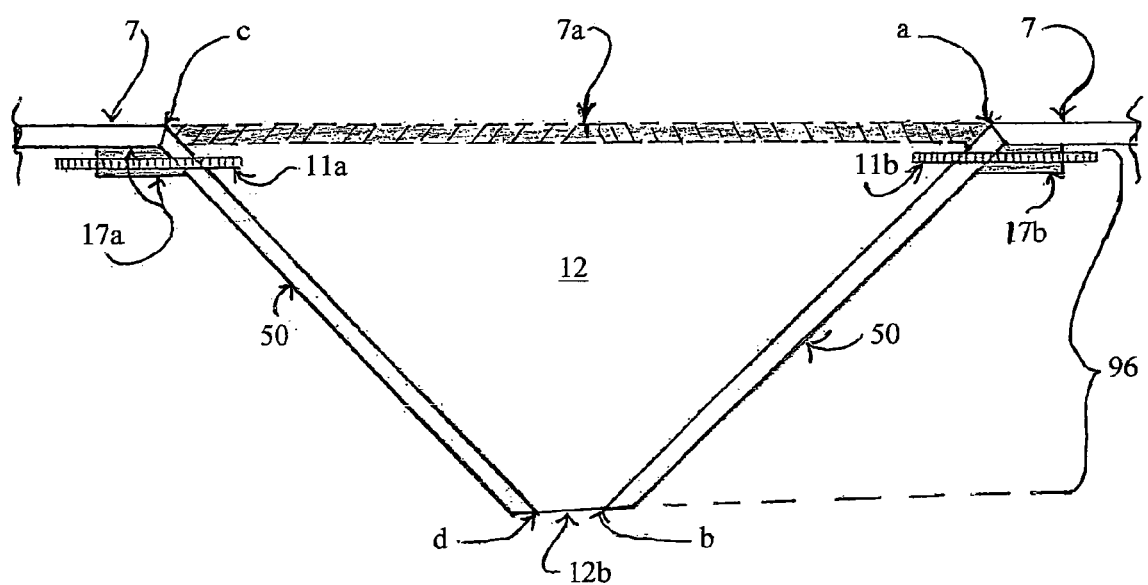
FIG. 2. Presents a side view of a centrally located vertical cross section of a completed Truck-Receiver Assembly and a partial section through the Base Plate that covers the hole in the truck bed and to which the Truck-Receiver Assembly is welded.

The actual union of the trailer borne segments of the hitch to the tow vehicle borne segments of the hitch occurs between a Trailer-Hitch Assembly (THA) 95 FIG. 1 and a Truck-Receiver Assembly (TRA) 96 FIG. 2; the trailer-borne THA being of an appropriate size and shape to drop into and fit comfortably within the tow vehicle-borne TRA.

The THA 95 FIG. 1 comprises in part a covered-funnel shaped member bracketed as 97 FIG. 1a and comprising in part characters numbered 4,5,6; said covered funnel shaped member comprises a circular, funnel top plate 4 FIG. 1a,b welded around a top end of a funnel side wall 5 FIG. 1a; said sidewall, from a topmost and greatest circumference, best represented as an outer circle 4gc FIG. 1a, continues downward at a slope along a circumferentially equal included top angle of between 40° and 50° relative to the funnel top plate as shown along a line d-c-4-a-b FIG. 1a; at a lowest extension d-b FIG. 1a the funnel side wall 5 is welded to a rod shaped probe 6 FIG. 1a, completing the funnel shaped member 97 FIG. 1a of the THA 95 FIG. 1a; said hitch ball portion 1,1a FIG. 1a of the ball and socket trailer hitch being situated in a central position atop the funnel top plate 4 and being best seen as circle 1a FIG. 1b which said circle represents a base section of said hitch ball; following a passage of a bolt portion of the hitch ball 2 FIG. 1a through said funnel top plate, a locking nut 3 FIG. 1a serves to lock the hitch ball to the THA.

The circular steel funnel top plate 4 FIGS. 1a & 1b has a diameter of approximately 9 inches. Seen from a top view perspective the THA 95 FIG. 1b appears as the circular funnel top plate 4 with a centrally situated hitch ball section 1 with a base portion of the hitch ball 1a FIG. 1a being seen as having a slightly greater diameter than the top section of the ball 1. Side wall section 5 of FIG. 1a is not visible in FIG. 1b nor is the probe section 6 of FIG. 1a, however, for purposes of showing the relative diameters of the funnel top plate 4 relative to the diameter of the probe 6, said probe section is indicated in FIG. 1b by a central shaded area 6a.

As seen in FIG. 1b, there is a great disparity between the diameter of the funnel top plate 4 of the THA 95 FIG. 1 and the diameter 6a FIG. 1b of the probe section 6. This disparity is what provides the surety that allows for an unassisted positioning of the THA relative to the TRA (yet to be described) in a connection-ready relationship without a driver leaving a cab section 98 FIG. 5a of the tow vehicle. This surety is possible because this invention creates between a six fold (6×) and a nine fold (9×) increase in the allowable positioning error when compared to conventional ball and socket hitch arrangements.

In a conventional system using a 2" ball, the socket portion of the hitch must be centered within a radius of 1" over the center of the ball assembly. Phrased another way, this means that the positioning error allowed in situating a hitch socket cup over the hitch ball allows that the socket cup portion can only be ¾" to 1" off to the right or left, forward or back of, or in any diagonal direction relative to the center of the top of the hitch ball, or the hitch connection cannot be made, this degree of positioning is not readily achieved without assistance or leaving the vehicle's cab.

The present invention increases the diameter of the target area to nine inches. This means that the center of probe 6 seen in FIG. 1a, can be off to the side, front or back, or diagonally in any direction by 4½" relative to the center of a receiver well diameter c-a FIG. 2 of a receiver well section 12 FIG. 2 of the TRA bracketed as 96 FIG. 2, a degree of positioning accuracy that is easily attainable and allows of safe completion of the coupling without the driver leaving the tow vehicle's cab.

Fifth wheel trailer hitches require a specially reinforced tow vehicle framework in order to support the greater weights they are called upon to carry. Conventionally available fifth wheel trailer tow vehicles are made with that reinforced framework. In the present invention, if such a framework is not already present, any tow vehicle can be retrofitted to satisfy this criterion. As a first step, a truck bed cutout (not shown but indicated in part by the broken line arrows 99 FIG. 2 is made in the bed of the truck, said truck bed cutout being situated directly over the truck's rear axle between a pair of tire wells 100 and 101 FIG. 3a at the mid-width of the tow-vehicle's bed, the area over which the hitch assembly bracketed as 92 FIG. 5a will attach to the TRA.

Figure 4:
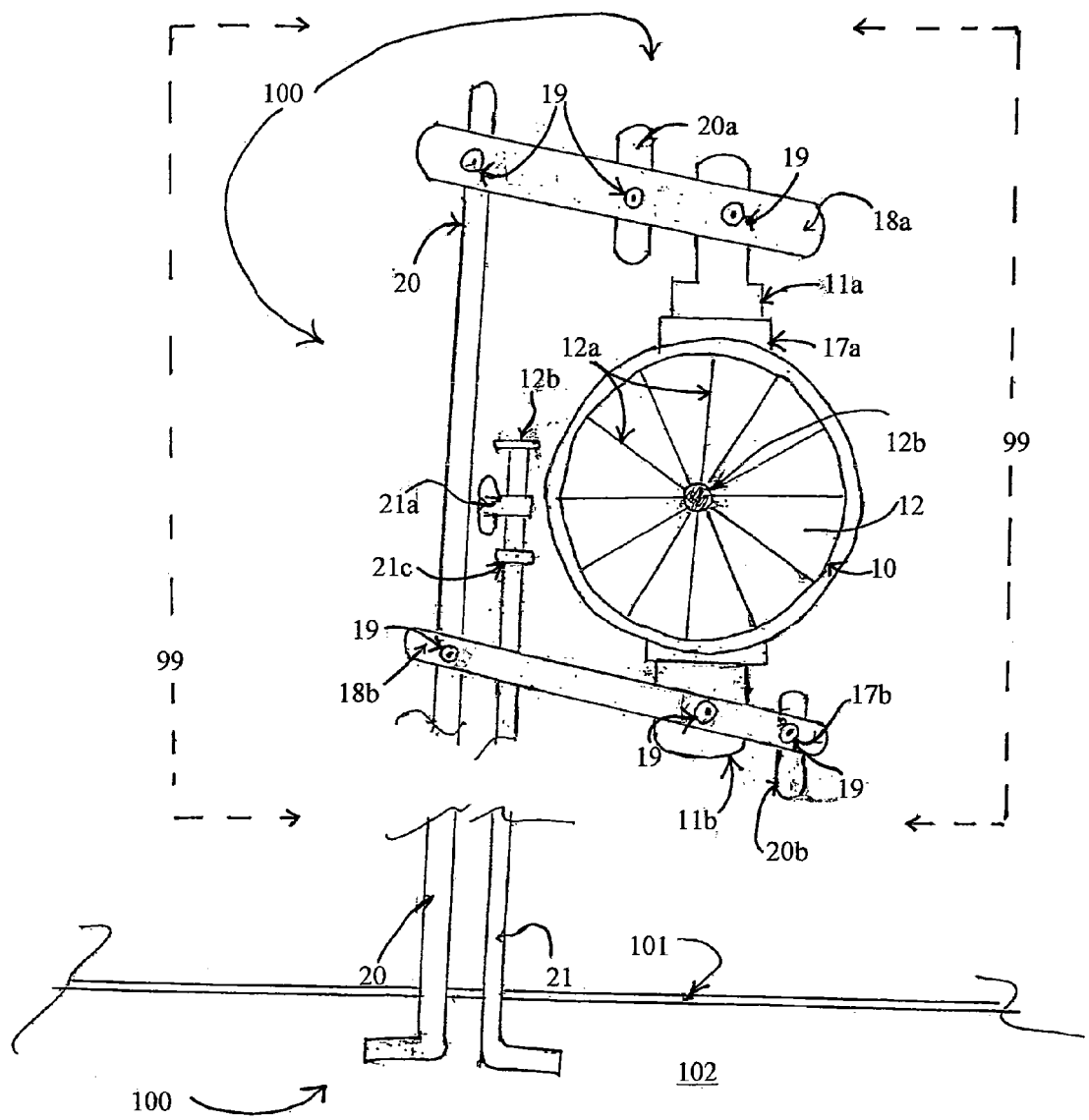
FIG. 4. Presents a diagrammatic sketch of the locking pin mechanism and the undersurface of the Truck-Receiver Well.

Working through and from beneath the truck bed cutout area 99 FIG. 4, a reinforcing framework (not shown for reasons of clarity) is affixed, bridging across a pair of frame members a right and a left frame member (not shown for reasons of clarity) beneath the truck bed. Any of the various commercially available truck-frame reinforcement conversion kits, or a self designed system can be used to provide the increased structural strength needed for this arrangement.

The abovementioned cutout in the truck bed is then covered by a bed cutout cover plate 7 FIG. 3a,b which is affixed to the above mentioned reinforcement framework by a set of bed cover plate bolts 14 FIG. 3a. If service is needed on any of the below-bed components of the hitch assembly, bed cutout cover plate 7 can be removed by loosening said bolts 14 and using the a pair of two lift rings 15 seen in FIGS. 3a & 3b to remove said cover plate.

A circular receiver well cutout hole 13a FIG. 3b that has been made in the bed cutout cover plate 7 FIGS. 3a & 3b serves to allow the above mentioned THA 95 FIG. 1 in FIGS. 1a & 1b to pass downward into a receiver well segment 12 FIG. 2 of a truck receiver assembly (TRA) that is to be described below. The size of this receiver well cutout hole in the bed cutout cover plate 7 is slightly larger than the 9" diameter of the top of the THA's side wall section 5 FIG. 1a. A temporary closure of the hole in the bed cutout cover plate 7 can be afforded by a hinged TRA cover plate 13 FIG. 3a,b that is attached to the bed cutout cover plate 7 by a hinge 16 FIGS. 3a & 3b. When closed as in FIG. 3a, said cover plate forms a level bed surface, thus allowing of a use of the tow vehicle for purposes other than towing a trailer, FIG. 3b shows the bed cutout cover plate opened on hinge 16 and presents an oblique view into the receiver well of the TRA in which can be seen the opening of a right side lock pin guide sleeve 17b, one of a pair of lock pin guide sleeves best seen as a left side lock pin guide sleeve 17a FIG. 2 and said guide sleeve 17b FIG. 2.

With TRA cover plate 13 in the open position, the THA A FIG. 1a can be lowered into the TRA and the hitch elements thus brought together. When viewed as a side view of a centrally located vertical cross section, the THA D FIG. 2 appears as follows: as seen at 10 FIG. 3b a top periphery of the receiver well is welded to and thus made flush with a top periphery of the circular receiver well cutout hole 13a FIG. 3b and the truck bed cutout cover plate 7; immediately beneath the top plate 7 and shown shaded are sections through the right and left guide sleeves 17a, 17b those guide sleeves provide an allowance of a passage of a pair of lock pins, a right side lock pin 11a FIG. 2 and a left side lock pin 11b FIG. 2 of a locking assembly 100 FIG. 4 of said hitch device of this invention;

From a greatest circumference at its topmost height, a greatest diameter of which is seen as c-a FIG. 2, a side wall 50 FIG. 2 of the receiver well D FIG. 2, descends at an appropriate angle of between 40 and 50 degrees providing an allowance for the funnel shaped member of the THA to fit within said receiver well, continuing downward at a circumferentially equal slope along said angle of between 40 degrees and 50 degrees relative to the horizontal plane of the truck bed cutout cover plate 7 FIG. 4 from a superior welded attachment to said cover plate 7 to form an open bottomed cone-shaped section having a vertical height of about 4" and forming there a lower orifice 12b FIG. 2 of said receiver well corresponding to line d-b FIG. 2, which said orifice allows the THA's funnel tip rod 6 FIG. 1 to pass through, allowing the TRA and the THA to come together for the full alignment of the trailer to the truck. Said bottom opening d-b in FIG. 2 also serves to allow drainage so that any fluids that might enter the apparatus can drain out the bottom of the unit.

Said guide sleeves 17a and 17b FIG. 2 which appear as separate shaded areas above and below lock pins 11, actually are in the form of rectangular tubes that are welded both to the undersurface of the cutout cover plate 7 and onto opposite sides of the lateral-superior aspect of the receiver well ab-bd-dc FIG. 2; a top view of said guide sleeves is found in FIG. 4 17a and 17b where a series of stabilization supports and activation arm elements for allowing a movement of Lock pins 11 into a locking mode can also be seen.

Figure 6:
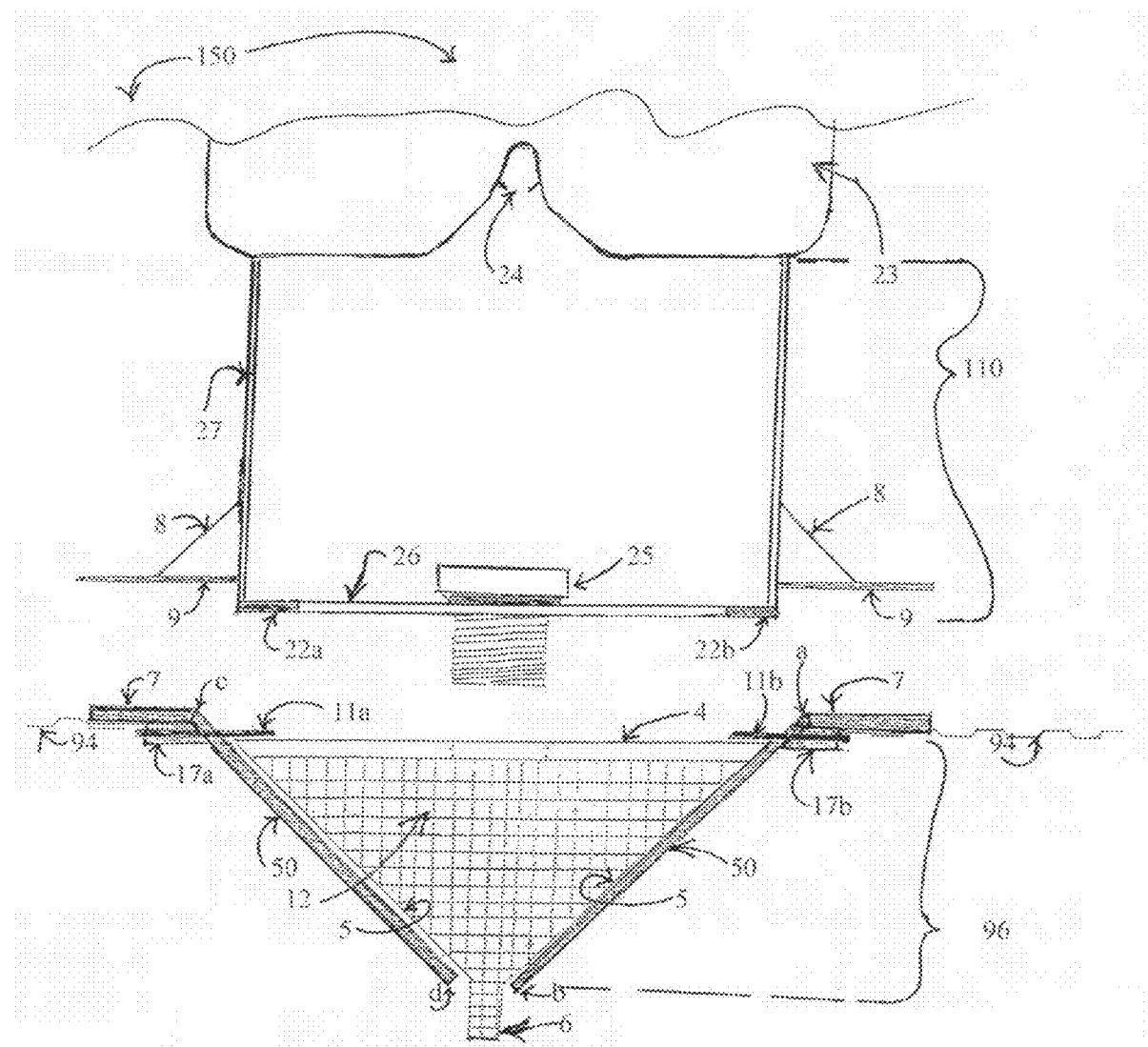
FIG. 6: Presents a side view of a centrally located vertical cross section of a modified Truck-Receiver Assembly suitable for use with either a fifth wheel trailer hitch assembly, or for attachment of a removable in-bed support framework such as is used to carry bicycles or panes of glass.

Lock pins 11 FIG. 2 slide through the guide sleeves 17 and serve to lock the THA in place within the TRA by virtue of sliding part way over the top of the funnel top plate 4 FIG. 6 of the THA, thus completing a locking of the trailer to the tow vehicle.

At a greatest circumference at a top periphery, as indicated by the arrow Ac FIG. 1b, the TRA receiver well is welded to the bed cutout cover plate 7, it has an internal diameter of 9", corresponding to an external top diameter of the top plate section of the THA 4 FIG. 1 which it is designed to receive. The hatched and lightly shaded area seen as line c-a of truck bed cutout cover plate 7 FIG. 2, represents the back curved portion of the cutout in bed cover plate 7 in which TRA cover plate 13 FIG. 3a would be located when the truck is to be used for purposes other than hauling a trailer.

Figure 5C:
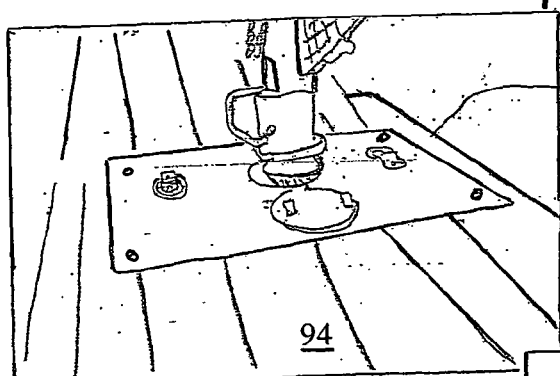
Figure 5D:
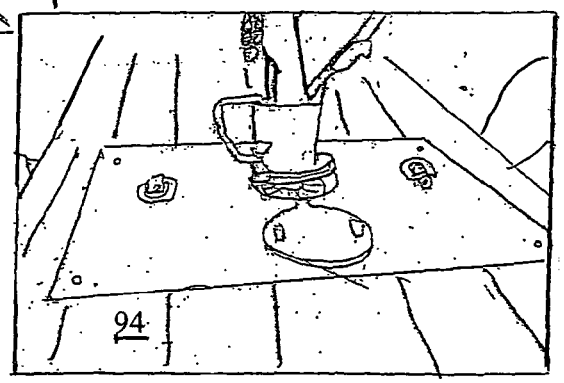

In use, the truck is backed up towards the trailer which has the THA already locked within the socket that is permanently part of the trailer's goose-neck tongue arrangement FIG. 5a,b,c,d. FIG. 5a,b,c,d present a sequential view moving from the start to the end of the hitching system in action. The relative positions of the truck and trailer at the time of starting to back the pickup towards the trailer are shown in FIG. 5*a* where the gooseneck tongue of the trailer 90 FIG. 5*a* with the attached TRA labeled as A can be seen situated over the rear of the tow vehicle's bed PB FIG. 5*a*. The TRA cover plate (13 in FIG. 2) is hinged open, for the purpose of clarity the other details of the view, described in detail priorly are not reproduced in this figure. The progression towards union of the connection at a time when the rod shaped probe 6 FIG. 2 of the THA has just dropped into the top of the receiver well of the TRA is seen in FIG. 5*b*. Continuing forward, in FIG. 5*c* the hitch assembly is shown at a time when the THA side wall 5 FIG. 1*a* has followed the guidance of the probe 6 and has dropped part way into the receiver well of the TRA. Finally, in FIG. 5*d*, the THA funnel shaped member B FIG. 1*a* has dropped fully into engagement within the TRA receiver well 12 FIG. 2 and all that remains to be done is the process of engaging the locking assembly mechanism that prevents accidental separation of the mated THA within the TRA.

To better understand the locking assembly mechanism that prevents disengagement of the trailer from the tow vehicle, said locking assembly mechanism is described in separate detail in FIG. 4. The view is looking up towards the underside of the truck bed and a segment of the truck bed cutout 99 FIG. 4 no further details of which truck bed cutout are shown.

A shaded in centrally located circle 12*b* FIG. 4 (also seen as line d-b FIG. 2) represents the hole at the apex of the truck-receiver well 12; the receiver well cone shaped section being represented by a series of laterally diverging lines 12*a* FIG. 4 that end peripherally at ring 10 FIG. 4 which represents the welded junction of TRA 12 and truck bed cutout cover plate 7 FIG. 2 the rest of which is not detailed in this figure.

Guide sleeves 17*a* and 17*b* FIG. 4 are welded to the driver and passenger side aspects of and near the top of the TRA's receiver well 12. Lock-pins 11*a* and 11*b* slide inward through guide sleeves 17*a* and 17*b* to lock the THA into the TRA as described prior in this descriptive text.

Still viewing FIG. 4, a connecting arm 18*a* is affixed to lock-pin 11*a* by a washer and bolt assembly 19, the washer and bolt assembly forming a loose connection that allows rotation of the connected sections around said assembly. (NOTE: all circles with a dot in the center represent such swivel attachments) A pivot point plate 20*a* is welded to the base of the truck bed which is situated above the bed cutout labeled TB in the figure; that pivot point serves as a fulcrum around which connecting arm 18*a* rotates to allow an inward and outward movement of a lock-pin 11*a* when a lock handle arm 20 is pushed inward to a locking position or pulled outward to allow a release of the THA from the TRA.

A connecting arm 18*b* is affixed to a lock-pin 11*b* by a washer and bolt assembly 19. A pivot point plate 20*b* is welded to the base of the truck bed and serves as the fulcrum around which connecting arm 11*b* rotates to allow a inward and outward movement of said lock-pin 11*b* when lock handle arm 20 is pushed inward to the locking position or pulled outward to allow release of the THA from the TRA.

Still viewing FIG. 4: A lift handle arm 21 passes beneath connecting arm 18*b*. A lift handle guide 21*a* is welded to the base of the truck bed and forms a curved lip over lift handle arm 21, and also serves as a stop foundation for a pair of stop rings 21*b* and 21*c*, which stops are situated on lock handle arm 21 and are adjusted such that they limit the throw of that lift handle arm, the function of which is to lift the TRA cover plate 13 FIG. 2 and tilt it back out of the way to allow an access to the cone section 12 FIG. 2. Note: if the TRA is covered by a rotating rather than a hinged top cover plate, lift handle arm 21 is modified such that it elevates and then rotates the TRA cover plate 13 FIGS. 3*a* & 3*b* out of the way (not shown).

Still viewing FIG. 4: Lock arm handle 20 and lift arm handle 21 are located exterior to a side wall SWTB of the tow vehicle bed immediately above the tire in the area of a driver's side rear wheel well TWS.

Pushing the lock arm handle 20 FIG. 4 of the lock-pin control assembly fully inward places the lock assembly into a locking mode by an activation of an inward movement of lock pins 11*a* and 11*b* inward through the lock pin guide sleeves 17*a* & 17*b*, resulting in a situation of the internal ends of said lock pi nsover the outer edges of the top plate 4 FIG. 1*a* of the THA, thus creating a locking of the THA into the TRA and thus providing a completion of a hitching of a tow vehicle to a trailer. With the exception of attaching emergency chains the unit is road ready at this point.

In a second embodiment a modified hitch device 150 FIG. 6 is seen; said modified hitch device allowing of an attachment of a tow vehicle to either of a fifth wheel trailer hitch assembly of a fifth wheel trailer hitch or an attachment to a removable, in bed support framework such as is used to carry bicycles or panes of glass 23 FIG. 6.

Said modified hitch device comprises: a truck hitch assembly (THA) 4,5,6 and 25 FIG. 6; a trailer receiver assembly (TRA) 96 FIG. 6; a riser tower 110 FIG. 6; and an attachment base for either a fifth wheel trailer hitch assembly or an in bed support framework 23,24 FIG. 6; said components are shown as a partially exploded side view of a centrally located vertical cross section through that modified hitch assembly.

Looking now at FIG. 6 it is seen that a covered funnel shaped member 4,5,6 of the THA comprises in part a circular top plate 4 FIG. 6 which said top plate is welded around a top end of a side wall 5 FIG. 6, said top end comprising a greatest circumference of said side wall, from said top end, said sidewall continues downward at a slope along a circumferentially equal included top angle of between 40° and 50° relative to said top plate of said funnel shaped member; at a lowest extension, said side wall is welded to a rod shaped probe 6 FIG. 6 completing said funnel shaped portion of said truck hitch assembly;

said modified hitch device further comprising in part a truck receiver assembly 96 FIG. 6, said truck receiver assembly comprising in part a receiver well section 12 FIG. 6; said receiver comprising a side wall 50 and a pair of lock pin receiver guide sleeves, a left side lock pin guide sleeve 17*a* and a right side lock pin guide sleeve 17*b*, which said guide sleeves provide an allowance for a passage of a pair of lock pins 11*a*, 11*b* FIG. 6 of a locking mechanism 100 FIG. 4 of said tow vehicle through said side wall 50 FIG. 6 of said truck receiver assembly such that an inner end of said lock pins projects over said top plate 4 FIG. 6 of said funnel shaped member when said truck hitch assembly is situated fully within the receiver well of said truck receiver assembly, thereby locking said THA within the receiver well of the TRA;

said receiver well being of an appropriate size and shape allowing of said covered funnel shaped member to fit within its confines; and, said receiver well being affixed in a bed 94 FIG. 6 of said tow vehicle; said bed having a bed cutout 99 FIG. 4 covered by a bed cutout cover plate 7 FIG. 6 within which said bed cutout cover plate a circular receiver well cutout hole of a diameter c-a FIG. 2 is located, said receiver well being welded around a top periphery 10 FIG. 3*b* of said receiver well cutout hole from which said top periphery said receiver well slopes downward and inward at a circumferentially equal angle of between 40 degrees and 50 degrees as depicted in FIG. 2 by angles formed between lines 50 and 7a thus providing an allowance for said funnel shaped member to fit within said receiver well of said truck receiver assembly as depicted in FIG. 6;

As seen in FIG. 6, said THA 4,5,6,25 is shown below and separated from a diagrammatic representation of said riser tower 110 FIG. 6; said riser tower 110 serves as an intermediate attachment means between said modified THA of the current invention and an attachment base section 23,24 FIG. 6 of either a fifth wheel trailer hitch assembly, or, a removable in bed support framework such as is used to carry bicycles or glass panes.

At a topmost section, said riser tower is affixable to and forms thereupon a connection with either a base section of a fifth wheel trailer hitch of a fifth wheel trailer hitch assembly or a base section of a removable in bed support framework.

A pair of riser tower lock pin receiver slots 22a and 22b FIG. 6 are situated in a right and a left lateral position of said base26 of said riser tower 110. When a pair of lock pins 11a and 11b FIG. 6 of a locking mechanism 100 FIG. 4 of said modified hitch mechanism are moved into a locked position, they not only serve to hold said THA locked within said TRA, but, they also move into said lock pin receiver slots 22a,22b and thereby serve in a manner preventing a rotational movement of said riser that would otherwise occur in their absence.

A THA top plate connector bolt 25 FIG. 6 passes between and affixes said top plate 4 of said THA 4,5,6,25, to a bottom plate 26 FIG. 6 of said riser tower. Once the THA top plate connector bolt is fixed in place, the riser tower and the THA in essence function as a single unit; then, with the top of the riser tower locked into the fifth wheel trailer hitch of a fifth wheel trailer hitch assembly or the base section of the removable in bed support framework, and, with the THA locked in to the TRA, there is formed a completed union between the tow vehicle and either the trailer or the removable in bed support system to which the riser tower is attached.

It is to be understood that the riser tower as described and depicted in FIG. 6 is not properly a part of the current invention and is not claimed as such, rather, it is presented solely for descriptive purposes; any of a variety of similar inter-connective elements as may be needed and either found commercially or self made for retrofitting a fifth wheel trailer hitch assembly or for retrofitting a removable in bed support framework onto an existing tow vehicle could serve the same purpose.

For purposes of clarity, the riser tower 110 FIG. 6 is shown separated from the covered, funnel shaped member of the THA 4,5,6 FIG. 6. However, to show the manner of making a final connection between the modified THA and the riser tower, the top plate connector bolt 25 is shown in place projecting downward from the base of said riser tower 110 FIG. 6, which said riser tower 110 is exemplary of such a riser tower that is suitable for retrofitting either a fifth wheel trailer hitch assembly or a removable in bed support framework onto an existing tow vehicle bed.

As an example of a Riser tower 110 FIG. 6 suitable for retrofitting either a fifth wheel hitch arrangement or a removable, in bed support framework said riser tower is further seen to comprise in part a cylindrical steel plate side wall 27 to which said bottom plate section 26 is welded; the whole of which riser tower 110 is in turn attached to a riser tower bed-top support plate 9, and the attachment of which elements is reinforced by a series of triangular shaped reinforcing struts 8 of which only two are visible; the whole being capped by either a fifth wheel attachment plate assembly or a removable in bed support framework as indicated by character number 23,24 FIG. 6. Said pair of Lock pin receiver slots 22a and 22b are seen at the right and left lateral ends of bottom plate section 26 of the riser tower 110.

It is obvious that the attachment of riser tower 110 to top plate 4 via bolt 25 must be done prior to the welding of the funnel shaped member side wall 5 FIG. 6 to said top plate 4 of the funnel shaped member of the THA.

With respect to a process for effecting a coupling of the modified to a-fifth wheel trailer hitch assembly, the trailer with the modified THA locked into and depending below the riser tower 110 FIG. 6, which riser tower in turn is locked into and depending from the fifth wheel trailer hitch by a lockage within an upper riser tower locking mechanism 24, FIG. 6, is approached; and because the riser tower and the fifth wheel hitch components are visible, the tow vehicle with the TRA in the tow vehicle bed uncovered can approach the trailer and be moved into a position such that the probe of the THA 6 will be within the zone above the top opening of the THA receiver well 12 FIG. 6 after which a jack of the trailer can be used to lower the THA into the TRA and the whole assembly can then be locked in place by an activation of a locking mechanism of the tow vehicle 100 FIG. 4; said activation comprises a movement of a pair of lock pins 11a,11b FIG. 6 into a pair of TRA lock pin guide slots 17a,17b FIG. 6, thus pinning the THA into the TRA and thus making a completed connection between the hitch of this invention and the fifth wheel trailer.

Because the fifth wheel trailer hitch components are not affixed to the truck bed itself, this invention allows for great ease in the removal of the king pin attachment plates of the fifth wheel trailer hitch that are otherwise cumbersome and somewhat difficult to remove; thus allowing easy conversion of the truck for temporary uses other than towing the trailer; and further, allowing the job to be done by one person, which is otherwise difficult.

With respect to a process for effecting a coupling of the modified THA to a removable in bed support framework, the exact same process is used as was described immediately prior for approaching and connecting with a fifth wheel trailer hitch excepting that instead of a fifth wheel hitch assembly depending from being situated atop the riser tower, an in bed support framework forms the top unit of the total hitch assembly.

What is claimed is:

1. A hitch device providing for attaching a goose-neck trailer tongue to a tow vehicle, said hitch device comprising in part a truck hitch assembly, which said assembly comprises a covered-funnel shaped member;

said covered funnel shaped member comprising a circular top plate which said top plate is welded around a top end of a side wall, said top end comprising a greatest circumference of said side wall, from said top end, said sidewall continues downward at a slope along a circumferentially equal included top angle of between 40° and 50° relative to said top plate of said funnel shaped member; at a lowest extension, said side wall is welded to a rod shaped probe completing the funnel shaped portion of said truck hitch assembly;

at said top plate, said covered funnel shaped member is affixed to a hitch ball portion of a ball and socket trailer hitch by a passage of a bolt portion of said hitch ball through said top plate of said funnel shaped member, following which said ball portion is locked in place atop said funnel top plate by a locking nut, completing thus said truck hitch assembly; which said truck hitch assembly is held in a removeable attachment within said trailer tongue by said hitch ball even when said tow vehicle is disconnected from said trailer;

said hitch device further comprising in part a truck receiver assembly, said truck receiver assembly comprising in part a receiver well; said receiver well being affixed in a bed of said tow vehicle; said bed having a bed cutout covered by a bed cutout cover plate within which said bed cutout cover plate a circular receiver well cutout hole is located, said receiver well being welded around a top periphery of said hole, from which said top periphery said receiver well slopes downward at an appropriate angle of between 40 degrees and 50 degrees, providing thus an allowance for said funnel shaped member to fit within said receiver well of said truck receiver assembly;

said receiver well of said truck receiver assembly also partially comprises a pair of lock pin guide sleeves; said lock pin guide sleeves provide for an allowing of a passage of a pair of lock pins of a locking mechanism of said tow vehicle though said side wall of said truck receiver assembly and the projection of an inner end of said guide sleeves over said truck hitch assembly top plate once said truck hitch assembly is situated fully within the confines of said truck receiver assembly;

when said trailer hitch assembly is lowered into place within said truck receiver assembly and said lock pins of tow vehicle locking mechanism are moved into a locked position, said connections complete an interconnection between said tow vehicle and said trailer.

2. A modified hitch device providing for attaching a tow vehicle to either of: a fifth wheel trailer hitch assembly of a fifth wheel trailer, or a removable in bed support framework;

said hitch device comprising in part a trailer hitch assembly, which said trailer hitch assembly comprises in part a covered-funnel shaped member; said covered funnel shaped member comprising a circular top plate which said top plate is welded around a top end of a side wall, said top end comprising a greatest circumference of said side wall, from said top end, said sidewall continues downward at a slope along a circumferentially equal included top angle of between 40° and 50° relative to said top plate of said funnel shaped member; at a lowest extension, said side wall is welded to a rod shaped probe completing the funnel shaped portion of said trailer hitch assembly;

said hitch device further comprising in part a truck receiver assembly, said truck receiver assembly comprising in part a receiver well; said receiver well being of an appropriate size and shape allowing of said covered funnel shaped member to fit within its confines;

said receiver well being affixed in a bed of said tow vehicle; said bed having a bed cutout covered by a bed cutout cover plate within which said bed cutout cover plate a circular receiver well cutout hole is located, said receiver well being welded around a top periphery of said receiver well cutout hole from which said top periphery a side wall of said receiver well slopes downward and inward at a circumferentially equal angle of between 40 degrees and 50 degrees thus providing an allowance for said funnel shaped member to fit within said receiver well of said truck receiver assembly;

said receiver well of said truck receiver assembly also partially comprises a pair of lock pin guide sleeves; said lock pin guide sleeves provide for an allowing of a passage of a pair of lock pins of a locking mechanism of said tow vehicle though said side wall of said truck receiver assembly and the projection of an inner end of said guide sleeves over said truck hitch assembly top plate once said truck hitch assembly is situated fully within the confines of said truck receiver assembly;

with a top plate connector bolt of said trailer hitch assembly fixed in place and securing a base plate of said trailer hitch assembly to a bottom plate of a riser tower, said truck hitch assembly and said riser tower in essence become a single unit;

then, with a top level of said riser tower locked into either a base section of a fifth wheel trailer hitch assembly or a base section of a removable in bed support framework; if said trailer hitch assembly is lowered into place within said truck receiver assembly and said lock pins of tow vehicle locking mechanism are moved into a locked position, said connections complete an interconnection between said tow vehicle and said trailer or said removable in bed support framework.

* * * * *